March 7, 1972  W. T. GRUBB ET AL  3,647,641
REACTANT SENSOR AND METHOD OF USING SAME
Filed Oct. 26, 1970
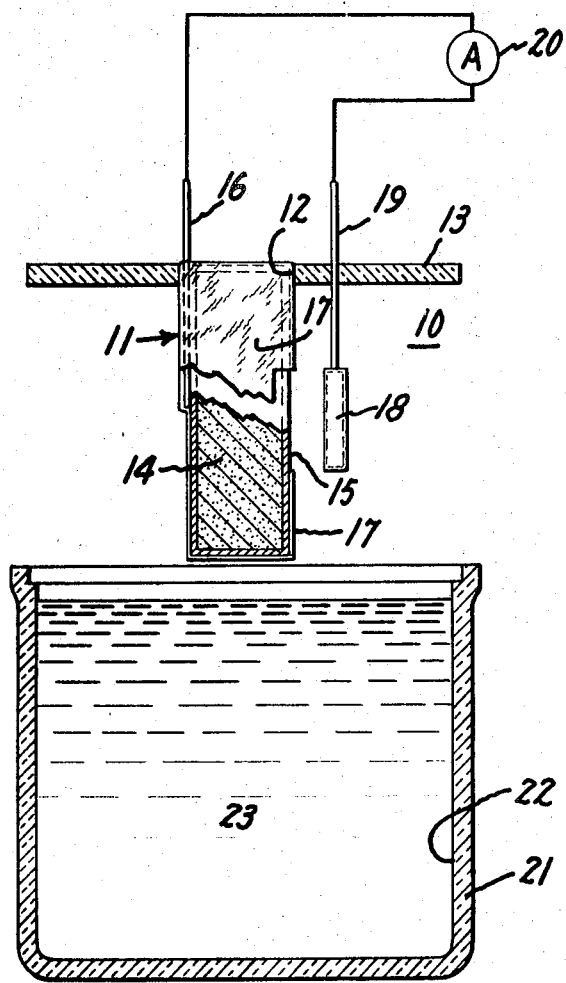
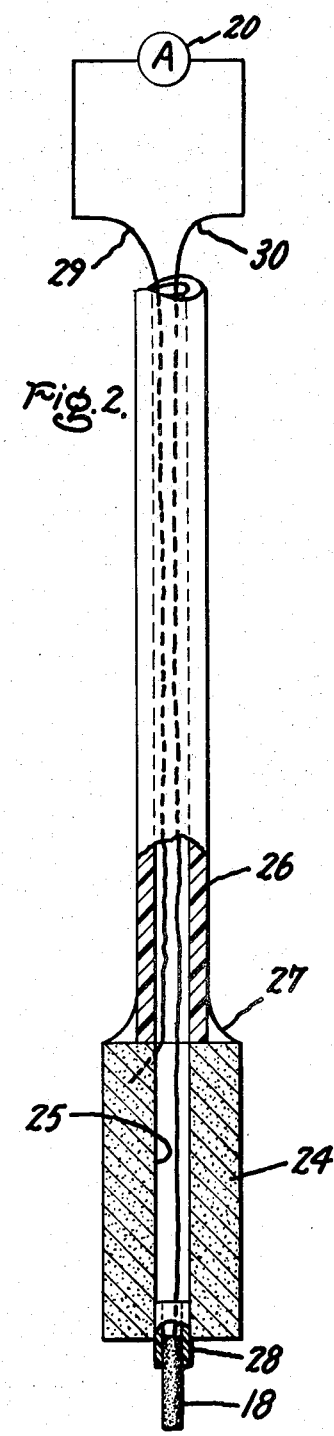
Inventors:
Willard T. Grubb,
Robert A. Macur,
by Paul R. Webb, II
Their Attorney.

United States Patent Office 3,647,641
Patented Mar. 7, 1972

3,647,641
REACTANT SENSOR AND METHOD OF
USING SAME
Willard T. Grubb, Schenectady, N.Y., and Robert A. Macur, Milwaukee, Wis., assignors to General Electric Company
Filed Oct. 26, 1970, Ser. No. 83,928
Int. Cl. G01n 27/46
U.S. Cl. 204—1 T                                    5 Claims

ABSTRACT OF THE DISCLOSURE

A reactant sensor is described which has a gas diffusion cathode, an anode spaced from the cathode, the anode with a catalytic coating of platinum, palladium, and a third less noble metal on a substrate the cathode being larger than the anode in a geometric area ratio of at least 3 to 1, and a current meter connected across the cathode and anode.

---

This invention relates to reactant sensors and, more particularly, to reactant sensors with an anode having a catalytic coating of platinum, palladium, and a selected third metal on a substrate.

Our invention is directed to a novel reactant sensor which has an anode containing a catalytic coating of platinum, palladium, and a selected third metal on a substrate. Such reactant sensors are useful in measuring a wide variety of reactants which are active at the anode of the sensor.

It is a primary object of our invention to provide an improved reactant sensor which is rugged, accurate and can be miniaturized.

In accordance with one aspect of our invention, a reactant sensor has a gas diffusion cathode, an anode spaced from the cathode, the anode with an electrically conducting substrate, a catalytic coating on the substrate comprising platinum, palladium, and a third metal less noble than platinum and palladium, the palladium present in an amount from ten to ninety or from twenty-five to seventy-five weight percent of both the platinum and palladium, and the third metal present in an amount from ten to fifty or from twenty to forty weight percent of the total coating metals, the cathode being larger than the anode in a geometric area ratio of at least 3 to 1, and a current meter connected across the cathode and the anode.

These and various other objects, features and advantages of the invention will be better understood from the following description taken in connection with the accompanying drawing in which:

FIG. 1 is a sectional view of a reactant sensor made in accordance with our invention; and FIG. 2 is a sectional view of a modified reactant sensor made in accordance with our invention.

In FIG. 1 of the drawing, there is shown generally at 10 a reactant sensor which has a gas diffusion cathode electrode 11 with one end fitted into an aperture 12 in a support 13. In this manner, the upper surface of the cathode electrode can be exposed to the atmosphere while the remaining portion of the cathode extends downwardly for subsequent contact with a reactant to be sensed. While a variety of electrodes can be employed, there is shown electrode 11 which has a porous carbon substrate 14 with a silver catalyst material 15 impregnated into and coating substrate 14, an electrical lead 16 is affixed to electrode 12 in any suitable manner, an impervious mask 17 covers or overlies porous cathode electrode 11 except for a portion of its surface which will face the air or oxygen or is opposed to an anode electrode 18. The opposed unmasked surface of cathode 11 is larger than anode 18 in a geometric area ratio of at least 3 to 1. Electrode 18, which is shown as a platinum wire with a catalytic coating of platinum, palladium and lead, with an electrical lead 19 is positioned close to but spaced from cathode 11. Electrical lead 19 supports and spaces anode 18 from cathode 11 by extending through support 13. It will be appreciated that various other suitable arrangements can be employed to support anode 18 and spaced the anode from cathode 11. A current meter 20 in the form of an ammeter is connected across cathode 11 and anode 18 by being connected to the respective electrical leads 16 and 19.

There is further shown in FIG. 1, a container 21 defining a chamber 22 with an upper open end. Container 21 is filled with a solution 23 containing an alkaline electrolyte and a reactant to be sensed.

We discovered unexpectedly that we can produce a reactant sensor which is rugged, accurate and can be miniaturized. Our sensor can be formed by providing a gas diffusion cathode, such as a porous carbon substrate with a silver catalyst material which has been wetproofed and has an impervious mask thereon except for a portion of its surface which will face the oxygen or air, and a portion which is opposed to an anode spaced therefrom. Such gas diffusion cathodes including wetproofing and masking are well understood in the art as set forth, for example, in U.S. Letters Patent 3,522,096 for a "Long Life Fuel Cell and Electrode Therefor" in the name of Williard T. Grubb issued July 28, 1970, and assigned to the same assignee as the present application. The cathode must be larger than the anode in a geometric area ratio of at least 3 to 1 whereby the limiting current measured by the sensor is a function of the concentration of the anodic reactant.

The anode is spaced from the cathode. This may be accomplished in a wide variety of manner such as described above in FIG. 1 wherein a support spaced apart the electrodes.

This anode can be formed from electrically conducting metallic or non-metallic substrates in various porous configurations. For example, suitable substrates include platinum, nickel, carbon, carbon with a nickel coating thereon, or other metals.

If the substrate is a non-noble metal, it can be contacted with a solution containing platinum, palladium and a selected third metal, for example, by immersion therein. The metals from this solution deposit on the substrate as catalytic material to form an improved electrode. If the substrate is made of a noble metal, has a coating of a noble metal thereon, or is made of carbon, a nickel electrode is connected to the substrate and immersed in a solution which is in electrolytic contact with the deposition solution whereby the metals deposit in a similar manner on the substrate to form an improved electrode.

The deposition solution is formed by mixing together a platinum solution, such as platinum chloride or chloroplatinic acid, and a palladium solution, such as palladous chloride. The third metal, which can be selected from a wide variety of metals is added to the above mixture in the form of a metallic salt. Suitable metals include thallium, cadmium, lead, copper, nickel, indium, manganese, mercury and cobalt. Suitable salts include thallous acetate, cadmium acetate, lead acetate, lead acetate trihydrate, cupric acetate, nickel acetate, indium trichloride, ferric acetate, manganous acetate, mercuric acetate, and cobaltous acetate.

If the anode has a non-noble metal substrate of nickel, the nickel is immersed, for example, into a solution of platinum, palladium and mercury salts and becomes coated with the ternary black of platinum, palladium and mercury because of a displacement reaction, nickel goes into solution forming nickel ions while platinum, palladium and mercury ions initially in the solution are deposited as a black on the nickel surface. However, if a carbon or noble metal substrate is to be employed for the anode, the substrate is connected to a nickel electrode through a wire and the nickel electrode is immersed into a solution which is in electrolytic contact with the deposition solution, then nickel dissolves in its solution and the ternary metal black of platinum, palladium, and a third metal is deposited onto the carbon or noble metal substrate immersed in the deposition solution.

We discovered unexpectedly that we sense a wide variety of reactants with our unique sensor by adding the reactant to an aqueous alkaline solution or electrolyte such as an aqueous alkali solution, an aqueous bicarbonate solution, or an aqueous carbonate solution. The electrolyte may be an aqueous alkaline solution of any desired concentration. While alkali metal hydroxides are the most commonly employed and of the lowest cost, it is appreciated that other soluble hydroxides may be employed, such as tetra-substituted ammonium or phosphonium hydroxides.

Reactants which can be sensed include alcohols, ethylene glycol, glycerol, sugars including glucose, fructose and sucrose, potassium formate, alkali salts of lactic acid or glycolic acid, etc. As used herein the term "alcohol" includes methanol, ethanol, n-propanol, and isopropanol—that is, any alcohol having from 1 to 3 carbon atoms. Methanol is a preferred alcohol for sensing on the basis of reactivity.

In FIG. 2 of the drawing, there is shown generally a modified reactant sensor which has a wetproofed gas diffusion cathode 24 of porous carbon. A central aperture 25 has been drilled therethrough. At its upper end a plastic tube 26 of polystyrene is provided for a convenient handle. A wax seal 27 is formed around the lower end of tube 26 and the upper portion of cathode 25. At the lower end of aperture 25 is cathode 24 there is positioned a segment of polytetrafluoroethylene tube 28 which positions and spaces an anode 18 from cathode 24. Electrical leads 29 and 30 are connected to cathode 24 and anode 18, respectively. A current meter 20 in the form of an ammeter is connected across cathode 24 and anode 18 by being connected to the respective leads 29 and 30. Cathode 24 is larger than anode 18 in a geometric area ratio of at least 3 to 1.

In the operation of the devices shown in FIGS. 1 and 2, a container 21 as shown in FIG. 1 is filled with a solution 23 containing an electrolyte of saturated potassium bicarbonate and a reactant of glucose at room temperature. The device of FIG. 1 is positioned on the upper open end of container 21 by seating support 13 thereon. Cathode 11 is substantially immersed therein at its lower end while its upper end is in contact with the air atmosphere. Anode 18 is immersed completely in solution 23. The current is read from the ammeter, which current is a function of the concentration of the reactant.

The device of FIG. 2 is employed in the same manner. The handle is used to immerse anode 18 complete and cathode 24 partially in solution 23 in container 21. The current is read in the same manner.

Examples of reactant sensors made in accordance with our invention are set forth below:

Example 1

An anode was prepared from a platinum wire. A vessel containing two compartments separated by a glass frit was filled with a deposition solution in one compartment containing 16 mg. of mercuric acetate, 5 milligrams of platinum as PtCl$_4$·2HCl, 5 milligrams of palladium as PdCl$_2$·4HCl in 80 ml. of water. The second compartment was filled with about 80 ml. of 1 normal hydrochloric acid. Into the first compartment was immersed a platinum wire 0.06 inch in diameter by 0.25 inch long, into the second compartment was immersed a piece of nickel foam of arbitrary dimensions. The nickel foam was connected by a wire to the platinum electrode. Deposition of a Pt, Pd, Hg black onto the platinum electrode was allowed to proceed for 30 minutes. The platinum electrode became covered with a velvety black coating. It was rinsed with distilled water.

A porous carbon cathode containing a silver catalyst impregnated therein was wetproofed with polyethylene. No masking was used. A hole was drilled through the center of the cathode. The cathode was larger than the anode in a geometric area ratio of 7.2 to 1.

At one end of the aperture in the cathode there was positioned a segment of polytetrafluoroethylene tube into which the above described platinum anode was fitted whereby the anode was spaced from the cathode. An electrical lead was attached to the opposite end of the anode and extended through the aperture and the cathode. A second electrical lead was attached to the cathode along the wall of the aperture. Both leads were then fed through a piece of polystyrene tube and extended out the opposite end thereof. The tube was then sealed to the opposite end of the cathode by means of a wax seal between one end of the tube and the adjacent surface of the cathode. The ends of the leads were attached to an ammeter. This assembly resulted in a reactant sensor made in accordance with our invention.

Example 2

The sensor of Example 1 was grasped by the tube which provided a convenient handle for immersing completely the anode and immersing partially the cathode in a solution containing an electrolyte of saturated potassium bicarbonate and a reactant of glucose which solution is at room temperature. After an initial current measurement, current was measured over 10 minutes while the solution remained in an unstirred non-deaerated condition. The results of these measurements are set forth below in Table I wherein the glucose concentration is shown in millimoles per liter and the current is shown in microamperes.

TABLE I

| Glucose millimoles per liter: | Current microamperes |
|---|---|
| 2 | 24 |
| 5 | 44 |
| 10 | 76 |
| 20 | 140 |
| 50 | 308 |

It will be noted in the above table that a nearly linear response is obtained. The device is highly sensitive.

Example 3

The same sensor from Example 1 was employed in the manner recited in Example 2. However, after each current measurement the solution was swept with nitrogen whereby response time of the electrode was approximately 10 seconds rather than 10 minutes as set forth in Example 2. The same linear relationship was obtained in these measurements.

While other modifications of the invention and variations thereof which may be employed within the scope of this invention have not been described, the invention is intended to include such as may be embraced within the following claims:

What we claim as new and desire to secure by Letters Patent of the United States is:

1. A reactant sensor comprising a gas diffusion cathode, an anode spaced from the cathode, the anode comprising an electrically conducting substrate with a catalytic coating comprising platinum, palladium, and a third metal less noble than platinum and palladium, the palladium present in an amount from ten to ninety weight percent of both the platinum and palladium, and the third metal present in an amount of ten to fifty weight percent of the total coating metals; the cathode being larger than the anode in a geometric area ratio of at least 3 to 1, and a current meter connected across the cathode and the anode.

2. A reactant sensor as in claim 1, in which the anode has palladium present in an amount from twenty-five to seventy-five weight percent of both the platinum and palladium, and the third metal in an amount of twenty to forty weight percent of the total coating metals.

3. A reactant sensor as in claim 1, in which the third metal is mercury.

4. A reactant sensor as in claim 1, in which the third metal is lead.

5. A method of sensing a reactant which comprises providing an alkaline electrolyte solution, dissolving a reactant in the solution, the reactant selected from the group consisting of alcohols, sugars, glycerol, ethylene glycol, and alkali salts of lactic acid and glycolic acid, providing a gas diffusion cathode, providing an anode spaced from the cathode, the cathode being larger than the anode in a geometric ratio of at least 3 to 1, the anode comprising an electrically conducting substrate with a catalytic coating comprising platinum, palladium, and a third metal less noble than platinum and palladium, the palladium present in an amount from ten to ninety weight percent of both the platinum and palladium, and the third metal present in an amount of ten to fifty weight of the total weight percent of the coating metals, immersing completely the anode in the solution, immersing partially the cathode in the solution, and measuring the current across the cathode and anode as a function of the concentration of the reactant.

References Cited
UNITED STATES PATENTS

| | | | |
|---|---|---|---|
| 2,939,827 | 6/1960 | Jacobson et al. | 204—195 |
| 3,160,577 | 12/1964 | Nolan | 204—195 |
| 3,514,335 | 5/1970 | Grubb | 136—86 R |
| 3,522,096 | 7/1970 | Grubb | 136—120 FC |

TA-HSUNG TUNG, Primary Examiner

U.S. Cl. X.R.

117—130 E; 136—86 D, 86 R; 204—47, 123, 195, 284, 290 R, 292, 293, 294